(12) United States Patent
Kim et al.

(10) Patent No.: US 12,021,719 B2
(45) Date of Patent: Jun. 25, 2024

(54) ARTIFICIAL INTELLIGENCE APPARATUS AND METHOD FOR PROVIDING TARGET DEVICE MANUAL THEREOF

(71) Applicant: LG ELECTRONICS INC., Seoul (KR)

(72) Inventors: Jaehong Kim, Seoul (KR); Hyejeong Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/048,001

(22) Filed: Oct. 19, 2022

(65) Prior Publication Data

US 2024/0022488 A1 Jan. 18, 2024

(30) Foreign Application Priority Data

Jul. 15, 2022 (WO) ................ PCT/KR2022/010365

(51) Int. Cl.
*H04L 43/0817* (2022.01)

(52) U.S. Cl.
CPC ................................ *H04L 43/0817* (2013.01)

(58) Field of Classification Search
CPC .... H04L 43/0817; H04L 43/065; H04L 43/04
USPC .......................................................... 709/224
See application file for complete search history.

(56) References Cited

U.S. PATENT DOCUMENTS

| | | | | |
|---|---|---|---|---|
| 2010/0262865 A1* | 10/2010 | Kim | ........................ | D06F 33/47 714/E11.029 |
| 2013/0114100 A1* | 5/2013 | Torii | .................. | H04N 1/00037 358/1.14 |
| 2015/0195182 A1* | 7/2015 | Mathur | ............... | G06F 11/2289 714/27 |
| 2016/0140960 A1 | 5/2016 | Chae | | |
| 2018/0159979 A1* | 6/2018 | Amir | .................... | H04M 3/5183 |
| 2019/0179959 A1* | 6/2019 | Dechu | ..................... | G06F 9/453 |
| 2019/0214009 A1 | 7/2019 | An et al. | | |
| 2021/0055983 A1* | 2/2021 | Constantin | ............ | H04L 43/065 |

(Continued)

FOREIGN PATENT DOCUMENTS

| | | |
|---|---|---|
| JP | 2017097712 | 6/2017 |
| KR | 1020160058523 | 5/2016 |

(Continued)

OTHER PUBLICATIONS

PCT International Application No. PCT/KR2022/010365, International Search Report dated Apr. 14, 2023, 9 pages.

*Primary Examiner* — Meng Vang
(74) *Attorney, Agent, or Firm* — LEE, HONG, DEGERMAN, KANG & WAIMEY

(57) ABSTRACT

The present disclosure relates to an artificial intelligence apparatus capable of providing a user manual corresponding to an abnormality diagnosis by diagnosing an abnormality of a target device inquired by a user, and a method for providing a target device manual thereof, and may be configured to, when receiving a user inquiry from the user terminal through the communication unit, analyze the user inquiry to set a diagnosis range of a target device, perform a diagnosis corresponding to the user inquiry within the set diagnosis range of the target device, generate a user manual for the performed diagnosis result, and control the communication unit to transmit the generated a user manual to the user terminal.

11 Claims, 15 Drawing Sheets

(56) References Cited

U.S. PATENT DOCUMENTS

| | | | |
|---|---|---|---|
| 2021/0091852 A1* | 3/2021 | Parangattil | ............. G06V 20/20 |
| 2021/0210073 A1 | 7/2021 | Shin et al. | |
| 2023/0118644 A1* | 4/2023 | Arguello | ............ G06Q 10/0631 |
| | | | 705/7.13 |

FOREIGN PATENT DOCUMENTS

| | | | | |
|---|---|---|---|---|
| KR | 1020190056935 | | 5/2019 | |
| KR | 1020190084566 | | 7/2019 | |
| KR | 1020210071523 | | 6/2021 | |
| KR | 1020210153165 | | 12/2021 | |
| WO | WO-2012142250 A1 * | 10/2012 | ............. G06K 9/228 |
| WO | 2019199043 | | 10/2019 | |

* cited by examiner

ARTIFICIAL INTELLIGENCE APPARATUS AND METHOD FOR PROVIDING TARGET DEVICE MANUAL THEREOF

CROSS-REFERENCE TO RELATED APPLICATION(S)

Pursuant to 35 U.S.C. § 119, this application claims the benefit of an earlier filing date and right of priority to International Application No. PCT/KR2022/010365, filed on Jul. 15, 2022, the contents of which are hereby incorporated by reference herein in its entirety.

BACKGROUND

The present disclosure relates to an artificial intelligence apparatus capable of providing a user manual corresponding to an abnormality diagnosis by diagnosing an abnormality of a target device inquired by a user, and a method for providing a target device manual thereof.

In general, artificial intelligence is a field of computer engineering and information technology that studies how computers can do thinking, learning, self-development, or the like that can be done by human intelligence and means allowing computers to mimic the intelligent behavior of humans.

In addition, artificial intelligence does not exist by itself, but has many direct and indirect connections with other fields of computer science. In particular, in modern times, attempts are being very actively made to introduce artificial intelligence elements in various fields of information technology and use them to solve problems in that field.

Meanwhile, technologies for recognizing and learning surrounding situations, providing information desired by a user in a desired form, or performing an operation or function desired by a user, using artificial intelligence are being actively studied.

In addition, an electronic device that provides such various operations and functions may be called an artificial intelligence device.

Meanwhile, when the user has an inquiry about product function, malfunction, or the like, if the inquiry is delivered to the product service center by voice, text, or the like through the user's terminal, guide information corresponding to the inquiry can be provided.

However, since the guide information provided by the user is guide information with reduced accuracy and reliability or the guide information is too wide, there was a difficulty in resetting the product because the user did not understand the guide information provided by the user, inaccurate guide information may cause additional product failure, and there was an inconvenience of having to additionally find only the desired guide information from the vast amount of guide information.

Therefore, in the future, by diagnosing the abnormality of the target device inquired by the user using artificial intelligence technology, and providing a user manual corresponding to the abnormal diagnosis based on augmented reality (AR), the user convenience will be improved, and it is necessary to develop a technology that can increase the accuracy.

SUMMARY

An object of the present disclosure is to solve the above problems and other problems.

An object of the present disclosure is to provide an artificial intelligence apparatus capable of improving user convenience by analyzing a user inquiry to set a diagnosis range of a target device, and performing a diagnosis corresponding to a user inquiry within the set diagnosis range of the target device to provide a user manual based on augmented reality (AR), and a method for providing a manual for a target device thereof.

In addition, An object of the present disclosure is to provide an artificial intelligence apparatus capable of providing an accurate and reliable user manual by performing a complex diagnosis based on image data of the target device and sensor data of the target device within the diagnostic range of the target device corresponding to the user inquiry, and a method for providing a manual for a target device thereof.

An artificial intelligence apparatus according to an embodiment of the present disclosure may include a communication unit configured to communicate with a user terminal; and, a processor configured to control the communication unit, in which the processor may be configured to, when receiving a user inquiry from the user terminal through the communication unit, analyze the user inquiry to set a diagnosis range of a target device, perform a diagnosis corresponding to the user inquiry within the set diagnosis range of the target device, generate a user manual for the performed diagnosis result, and control the communication unit to transmit the generated a user manual to the user terminal.

A method for providing a target device manual of an artificial intelligence device according to an embodiment of the present disclosure may include receiving a user inquiry from the user terminal; setting a diagnosis range of a target device by analyzing the user inquiry; performing a diagnosis corresponding to the user inquiry within the set diagnosis range of the target device; generating a user manual for the performed diagnosis result; and transmitting the generated user manual to the user terminal.

According to an embodiment of the present disclosure, the artificial intelligence apparatus analyzes a user inquiry to set a diagnosis range of a target device, and performs a diagnosis corresponding to the user inquiry within the set diagnosis range of the target device to provide an augmented reality (AR)-based user manual, and thus user convenience can be improved.

In addition, according to an embodiment of the present disclosure, the artificial intelligence apparatus performs a complex diagnosis based on image data of the target device and sensor data of the target device within a diagnosis range of the target device corresponding to the user inquiry and thus can provide an accurate and reliable user manual.

DETAILED DESCRIPTION OF THE EMBODIMENTS

Figure 1:
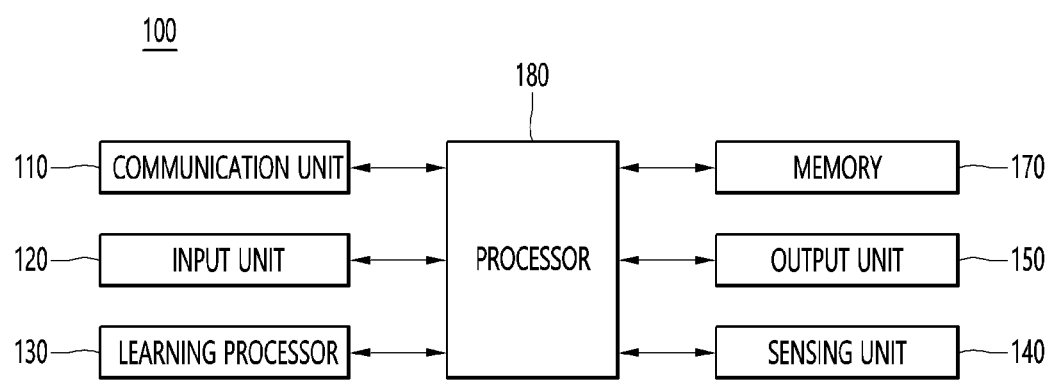
FIG. 1 illustrates an artificial intelligence apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Also, throughout this specification, a neural network, a neural network, and a network function may be used interchangeably. A neural network may be composed of a set of interconnected computational units, which may be generally referred to as "nodes". These "nodes" may also be referred to as "neurons". A neural network is configured to include at least two or more nodes. Nodes (or neurons) constituting the neural networks may be interconnected by one or more "links".

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
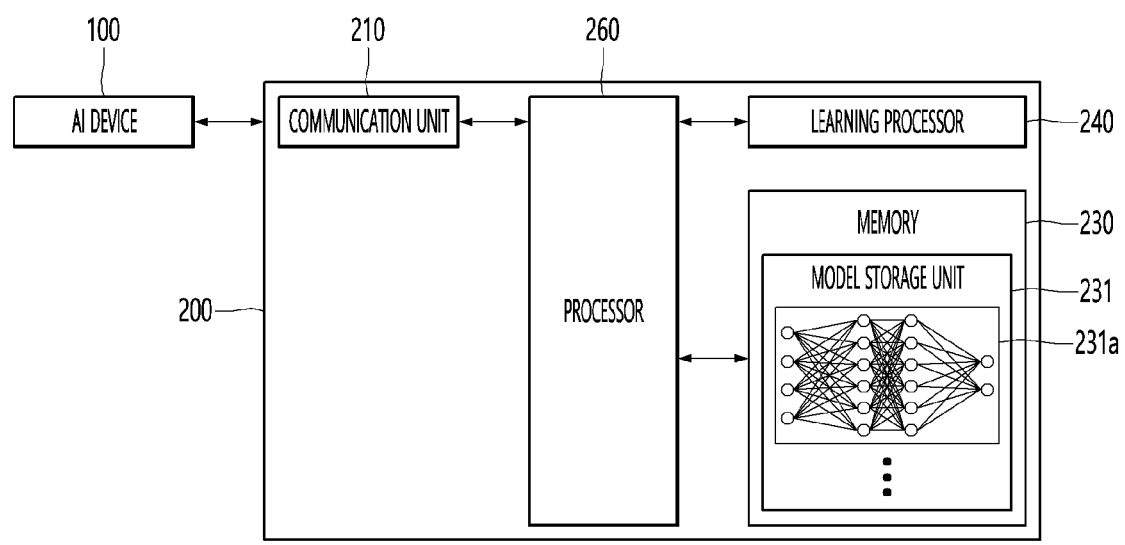
FIG. 2 illustrates an artificial intelligence server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
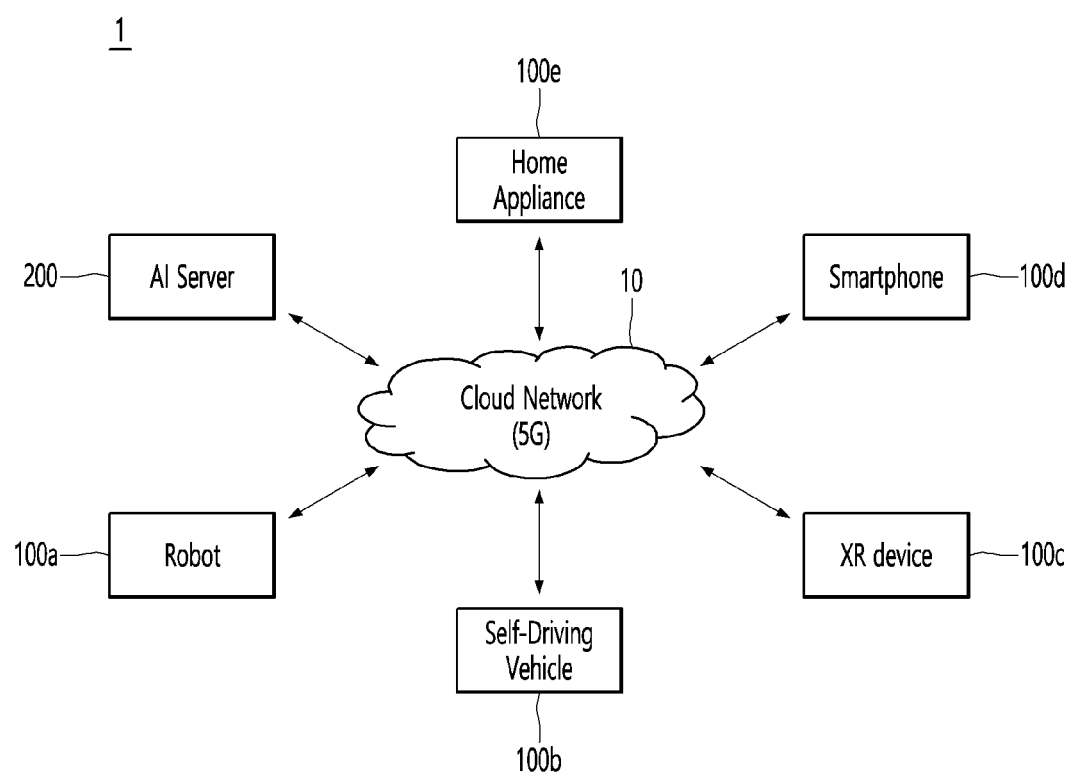
FIG. 3 illustrates an artificial intelligence system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
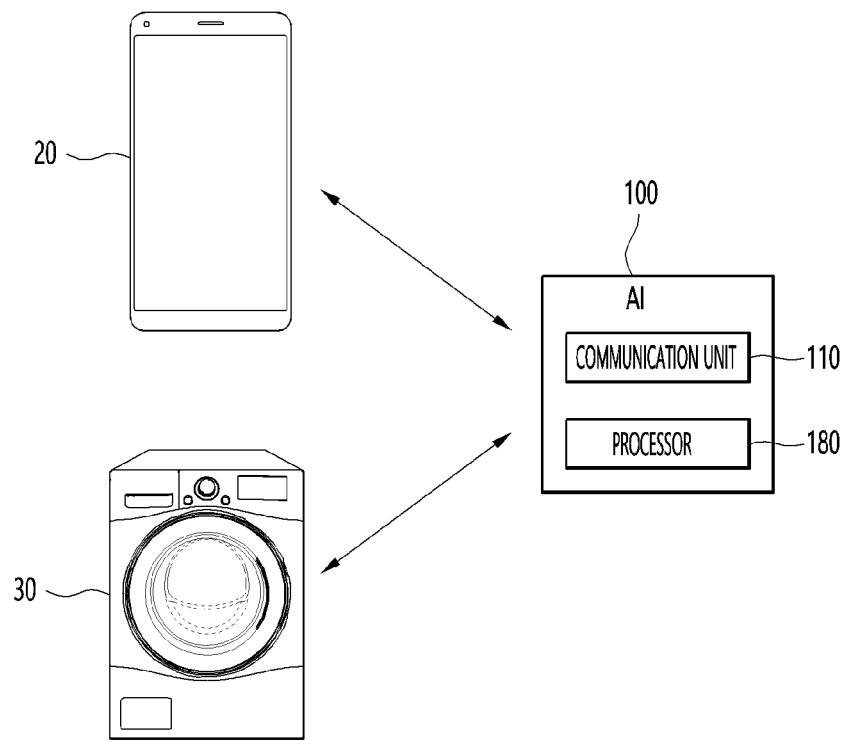
FIG. 4 is a diagram for explaining an operation of an artificial intelligence apparatus according to an embodiment of the present disclosure.

FIG. 4 is a diagram for explaining an operation of an artificial intelligence apparatus according to an embodiment of the present disclosure.

As shown in FIG. 4, the artificial intelligence apparatus 100 of the present disclosure may include a communication unit 110 that communicates with the user terminal 20 and a processor 180 that controls the communication unit 110.

Here, the processor 180, when receiving a user inquiry from the user terminal 20 through the communication unit 110, may control the communication unit 110 to analyze the user inquiry to set a diagnosis range of the target device 30, to perform a diagnosis corresponding to the user inquiry within the diagnosis range of the set target device 30, to generate a user manual for the performed diagnosis result, and to transmit the generated user manual to the user terminal 20.

The processor 180, when receiving the user inquiry, may receive the user inquiry in the form of at least one of voice data, image data, and text data.

For example, the processor 180, if the user inquiry is voice data, may convert the voice data into text, extract a keyword corresponding to a device property from the converted text, and analyze the user inquiry based on the extracted keyword.

Here, the processor, when converting the voice data into text, may convert the voice data into text through Speech-to-Text (STT), which is only an example, and is not limited thereto.

In addition, the processor 180, when extracting the keyword, may extract at least one of a device-related keyword, an abnormal-related keyword, and a request-related keyword.

In this case, the processor 180 may estimate the target device 30 based on the device-related keyword, estimate an abnormal portion of the target device 30 based on the abnormal-related keyword, and estimate the user's request for the target device 30 based on the request-related keyword.

In addition, the processor 180, when extracting the keyword, may input the converted text from the voice data into the pre-learned artificial intelligence model to extract the keyword, and classify the extracted keyword into at least any one of the device-related keyword, the abnormal-related keyword, and the request-related keyword.

As another example, the processor 180, if the user inquiry is image data, may extract text from the image data, extract a keyword corresponding to a device property from the extracted text, and analyze the user inquiry based on the extracted keyword.

Here, the processor 180, when extracting text from the image data, may extract the text from the image data through optical character recognition, which is only an example, but is not limited thereto.

In addition, the processor 180, when extracting the keyword, may extract at least one of a device-related keyword, an abnormal-related keyword, and a request-related keyword.

In this case, the processor 180 may estimate the target device 30 based on the device-related keyword, estimate an abnormal portion of the target device 30 based on the abnormal-related keyword, and estimate the user's request for the target device 30 based on the request-related keyword.

In addition, the processor 180, when extracting the keyword, may input the text extracted from the image data into the pre-learned artificial intelligence model to extract the keyword, and classify the extracted keyword into at least any one of to the device-related keyword, the abnormal-related keyword, and the request-related keyword.

As another example, the processor 180, if the user inquiry is text data, may extract a keyword corresponding to a device property from the text data and analyze the user inquiry based on the extracted keyword.

Here, the processor 180, when extracting the keyword, may extract at least one of a device-related keyword, an abnormal-related keyword, and a request-related keyword.

In this case, the processor 180 may estimate the target device 30 based on the device-related keyword, estimate an abnormal portion of the target device 30 based on the abnormal-related keyword, and estimate the user's request for the target device 30 based on the request-related keyword.

In addition, the processor 180, when extracting the keyword, may input the text data into the pre-learned artificial intelligence model to extract the keyword and classify the extracted keyword into at least one of a device-related keyword, an abnormal-related keyword, and a request-related keyword.

Next, the processor 180, when setting the diagnosis range of the target device 30, if a user inquiry is received, may extract a keyword corresponding to a device property from the user inquiry and analyze the type of target device, an abnormal portion of the target device, and a user request for the target device based on the extracted keyword included in the inquiry question to set the diagnosis range of the target device 30.

Here, the processor 180, when extracting the keywords, may input text data corresponding to the user inquiry into the pre-learned artificial intelligence model to extract the keywords, and classify the extracted keywords into at least one of device-related keywords, abnormal-related keywords, and the request-related keywords.

In some cases, the processor 180, when setting the diagnosis range of the target device 30, if the user inquiry is voice data, may analyze the voice recognition-based user inquiry to primarily set the diagnosis range of the target device 30, and if the target device-related image data is received, analyze the image based target device 30 to secondarily set the diagnosis range of the target device 30.

Here, the processor 180, when primarily setting the diagnosis range of the target device 30, may request the user terminal 20 to provide the target device related image data, and when receiving the target device related image data requested from the user terminal 20, analyze the image-based target device 30 to secondarily set the diagnosis range of the target device 30.

In this case, the processor 180, when requesting the target device related image data, may request the user terminal 20 to provide image data for the operation of the target device 30.

In addition, the processor 180, if the target device-related image data requested from the user terminal 20 is not received within a preset time, may stop the secondary setting of the diagnosis range of the target device 30.

In another case, the processor 180, when setting the diagnostic range of the target device 30, if the user query is voice data, may analyze the voice recognition-based user query to primarily set the diagnostic range of the target device 30, when receiving the target device 30-related image data, analyze the image-based target device 30 to secondarily set the diagnostic range of the target device 30, and when receiving sensor data of the target device 30, analyze the abnormality of the target device 30 based on the sensor data to tertiarily set the diagnosis range of the target device.

Here, the processor 180, when primarily setting the diagnosis range of the target device 30, may request the user terminal 20 to provide the target device 30-related image data, and when receiving the requested target device 30 related image data from the user terminal 20, analyze the image-based target device 30 to secondarily set the diagnosis range of the target device 30.

In this case, the processor 180, when requesting the target device 30-related image data, may request the user terminal 20 to provide image data for the operation of the target device 30.

In addition, the processor 180, if the target device-related image data requested from the user terminal 20 is not received within a preset time, may stop the secondary setting of the diagnosis range of the target device 30.

In addition, the processor 180, when secondarily setting the diagnosis range of the target device 30, may control the communication unit 110 to communicatively connecting to the target device 30, when communicatively connecting to the target device 30, request the sensor data to the target device 30, and when receiving the sensor data requested from the target device 30, analyze an abnormality of the target device 30 based on the sensor data to tertiarily set the diagnosis range of the target device 30.

Here, the processor 180, when requesting sensor data from the target device 30, may request sensor data for specific sensors corresponding to the diagnosis range of the target device 30 among the sensors of the target device 30.

In this case, the processor 180, when the sensor data requested from the target device 30 is not received within a preset time, may stop the tertiary setting of the diagnosis range of the target device 30.

Next, the processor 180, when setting the diagnosis range of the target device 30, if receiving a user inquiry including voice data, may set the diagnosis range of the target device by analyzing the voice recognition-based user inquiry.

In some cases, the processor 180, when setting the diagnosis range of the target device 30, if a user inquiry including voice data and image data of the target device is received, may analyze the voice recognition-based user inquiry and the image-based target device to set a diagnosis range of the target device 30.

As another case, the processor 180, when setting the diagnostic range of the target device 30, if receiving a user inquiry including voice data, image data of the target device, and sensor data of the target device, may analyze the voice recognition-based user inquiry, the image-based target device, and an abnormality of the target device based on the sensor data to set the diagnosis range of the target device 30.

Here, the image data of the target device 30 may include image data on the operation of the target device 30, and the sensor data of the target device 30 may include sensor data for specific sensors corresponding to the diagnostic range of the target device 30 among the sensors of the target device 30.

Then, the processor 180, when performing the diagnosis, if the user inquiry is voice data, may diagnose the type and the cause of abnormality of the target device 30 within the diagnosis range of the target device 30 set based on the keyword extracted from the voice data.

In some cases, the processor 180, when performing the diagnosis, if receiving at least one of the image data and the sensor data of the target device 30, may diagnose the type and the cause of the abnormality of the target device 30 within the diagnosis range of the target device 30 set based on at least one of the image data and the sensor data.

In addition, the processor 180, when generating the user manual, may generate an augmented reality (AR)-based user manual including the information on the user response action based on the cause of the abnormality.

Next, the processor 180, when transmitting the user manual, if the target device photographed through the camera of the user terminal 20 is displayed on the screen of the user terminal 20, may provide augmented reality-based user manuals around the target device displayed on the screen.

Here, the processor 180, when the user manual includes content related to manipulation of a specific button of the target device, may provide the shape of the specific button around the target device displayed on the screen of the user terminal 20 in augmented reality.

In some cases, the processor 180, when the user manual includes content related to manipulation of a specific button of the target device, may provide an identifier informing the target device displayed on the screen of the user terminal 20 of the position of a specific button in augmented reality.

As another case, the processor 180, when content related to manipulation of the abnormal portion of the target device is provided in the user manual, may provide an identifier informing the target device displayed on the screen of the user terminal 20 of the position of the abnormal portion in augmented reality.

In addition, the processor 180, when transmitting the user manual, if a target device photographed through the camera of the user terminal 20 is displayed on the screen of the user terminal 20, may provide the user manual as voice data and provide an identifier informing the target device displayed on the screen of a specific part displayed by the voice data of the user manual in augmented reality.

In addition, the processor 180, when transmitting the user manual, if the target device photographed through the camera of the user terminal 20 is displayed on the screen of the user terminal 20, may provide a user manual re-request button in augmented reality around the target device displayed on the screen.

Here, the processor 180, when receiving a user input for selecting the user manual re-request button, may reset the diagnostic range of the target device 30 and re-perform the diagnosis corresponding to the user inquiry within the diagnosis range of the reset target device and regenerate user manual for the re-performed diagnosis result to provide the user manual to the user terminal 20.

In this case, the processor 180 may re-request the user inquiry to the user terminal when a user input for selecting the user manual re-request button is received one or more times.

In addition, the processor 180, when transmitting the user manual, may transmit the user manual in the form of at least one of voice data, image data, and text data.

As such, the present disclosure sets the diagnostic range of the target device by analyzing the user's query, and performs a diagnosis corresponding to the user's query within the set diagnostic range of the target device to provide the user manual based on augmented reality (AR), and thus user convenience can be improved.

In addition, the present disclosure may provide an accurate and reliable user manual by performing a complex diagnosis based on image data of the target device and sensor data of the target device within the diagnostic range of the target device corresponding to the user inquiry.

Figure 5:
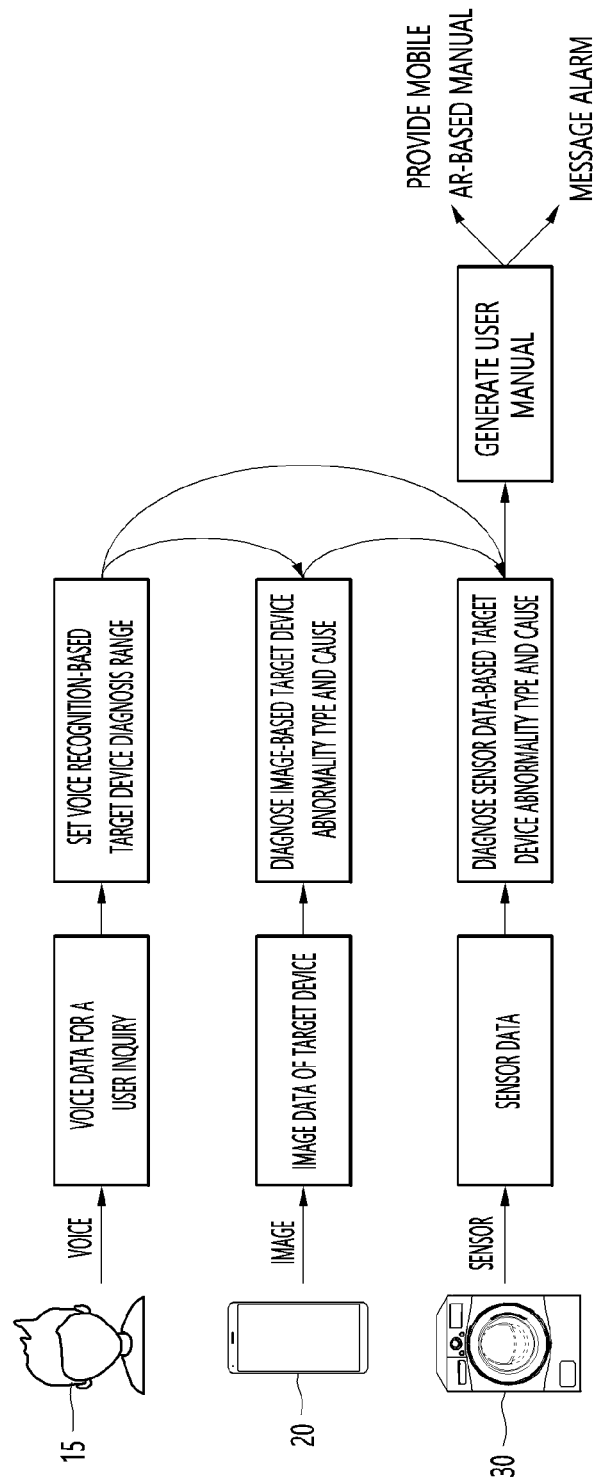
FIG. 5 is a diagram for explaining a process of providing a user manual of an artificial intelligence apparatus according to an embodiment of the present disclosure.

FIG. 5 is a diagram for explaining a process of providing a user manual of an artificial intelligence apparatus according to an embodiment of the present disclosure.

As shown in FIG. 5, the artificial intelligence apparatus of the present disclosure, upon receiving voice data for a user inquiry from the user 15, may analyze the user inquiry based on voice recognition to set the diagnostic range of the target device 30.

In other words, the artificial intelligence apparatus may convert voice data for a user inquiry into text data, extract a keyword corresponding to a device property from the converted text data, and analyze the type of target device, an abnormal portion of the target device, and a user request for the target device included in the user inquiry based on the extracted keyword to set the diagnosis range of the target device 30.

For example, the artificial intelligence apparatus may input text data corresponding to the user inquiry into the pre-learned artificial intelligence model to extract keywords and classify extracted keywords into any one of a device-related keyword, an abnormal-related keyword, and a request-related keyword.

In addition, the artificial intelligence apparatus, when receiving the image data of the target device 30 from the user terminal 20, may analyze the image-based target device 30 to diagnose the type and the cause of the abnormality of the target device 30.

In addition, the artificial intelligence apparatus, when receiving the sensor data of the target device 30 from the target device 30, may analyze the target device 30 based on the sensor data to diagnose the type and the cause of abnormality of the target device 30.

For example, the artificial intelligence apparatus, in a case where the target device 30 is a drum washing machine, when the drum washing machine operates, may acquire sensor data from a level sensor and a vibration sensor of the drum washing machine to diagnose abnormalities in vibration, causes of vibration of the drum washing machine, or the like.

As such, the artificial intelligence apparatus of the present disclosure, if the user inquiry is voice data, may set the diagnosis range of the target device 30 based on a keyword extracted from the voice data, and if receiving at least one of the image data and the sensor data of the target device 30, diagnose the type and the cause of abnormality of the target device 30 within a diagnosis range of the target device 30 based on at least one of image data and sensor data.

In addition, the artificial intelligence apparatus may generate a user manual including information on the user response action based on the cause of the abnormality.

Next, the artificial intelligence apparatus, when the target device 30 photographed through the camera of the user terminal 20 is displayed on the screen of the user terminal 20, may provide augmented reality (AR)-based user manual around the target device displayed on the screen.

In addition, the artificial intelligence apparatus may provide a message alarm for providing a user manual to the user terminal 20.

As such, the artificial intelligence apparatus of the present disclosure may perform a complex diagnosis based on the image data of the target device and the sensor data of the target device within the diagnostic range of the target device corresponding to the user inquiry, thereby providing an accurate and highly reliable user manual.

FIGS. 6 to 10 are diagrams for explaining a process of diagnosing each target device and generating a user manual of an artificial intelligence apparatus according to an embodiment of the present disclosure.

Figure 6:
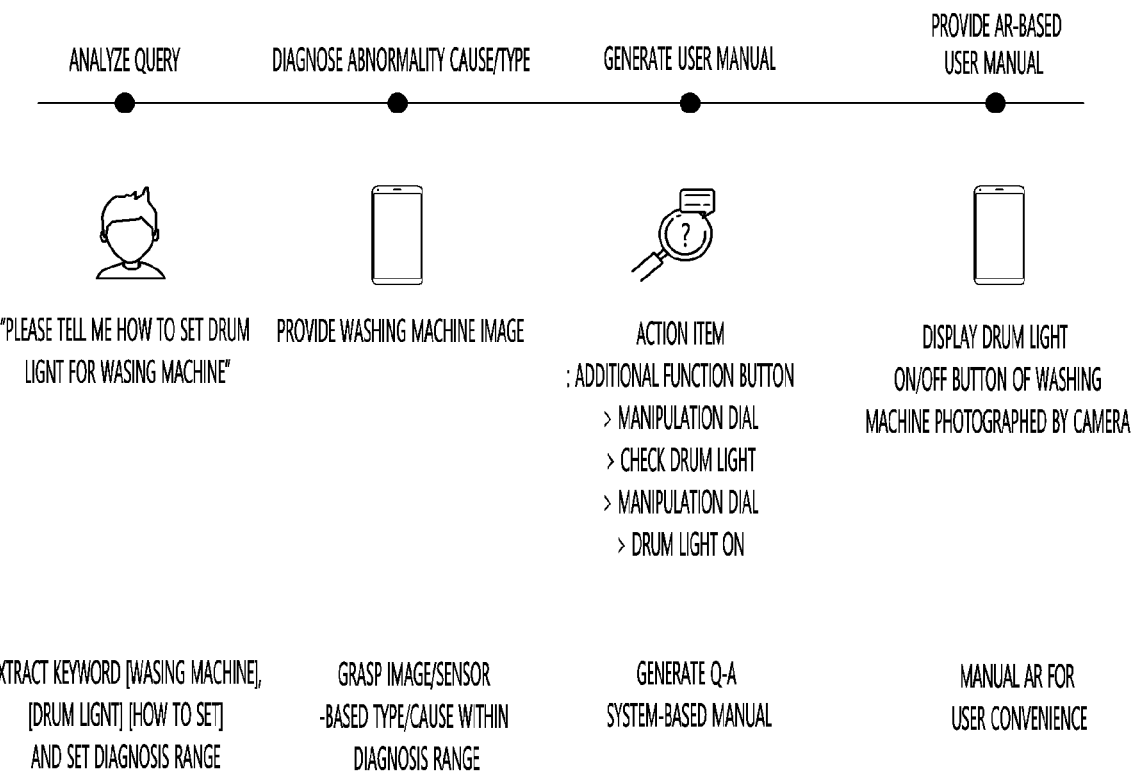
FIGS. 6 to 10 are diagrams for explaining a process of diagnosing each target device and generating a user manual of an artificial intelligence apparatus according to an embodiment of the present disclosure.

FIG. 6 is a diagram for explaining a process of diagnosing an abnormality of a washing machine and generating a user manual when a target device of a user inquiry is a washing machine.

As shown in FIG. 6, when a user inquiry "Please tell me how to set the drum light for the washing machine" is input as voice data from the user, the artificial intelligence apparatus of the present disclosure may convert the voice data into text data, and extract the keyword corresponding to a device property from the converted text data.

For example, the artificial intelligence apparatus may extract keywords such as a washing machine, a drum light, and a setting method from a user inquiry "Please tell me how to set the drum light for the washing machine," and set the diagnosis range as the drum light part of the washing machine.

As described above, the artificial intelligence apparatus of the present disclosure may set the diagnosis range of the washing machine by analyzing the type of washing machine, an abnormal portion of the washing machine, and a user request for the washing machine, included in the user inquiry based on the keyword.

In addition, the artificial intelligence apparatus, upon receiving at least one of image data and sensor data of the washing machine, may analyze the drum light portion of the washing machine based on the image data and sensor data to diagnose the type and the cause of abnormality of the drum light.

Next, the artificial intelligence apparatus may generate a user manual including information on a user corresponding action for a drum light related setting method.

As an example, the artificial intelligence apparatus may provide a user action item portion related to drum light manipulation in a user manual based on a question-answer system.

Here, the user action item related to drum light manipulation may include a description of a manipulation method that the user should sequentially perform, such as an additional function button, manipulation dial, drum light check, manipulation dial, drum light on, or the like.

Then, the artificial intelligence apparatus, when the washing machine photographed through the camera of the user terminal is displayed on the screen of the user terminal, may provide an augmented reality (AR) based drum light on/off button to the washing machine displayed on the screen.

As such, the artificial intelligence apparatus of the present disclosure may provide an augmented reality-based user manual for user convenience.

Figure 7:
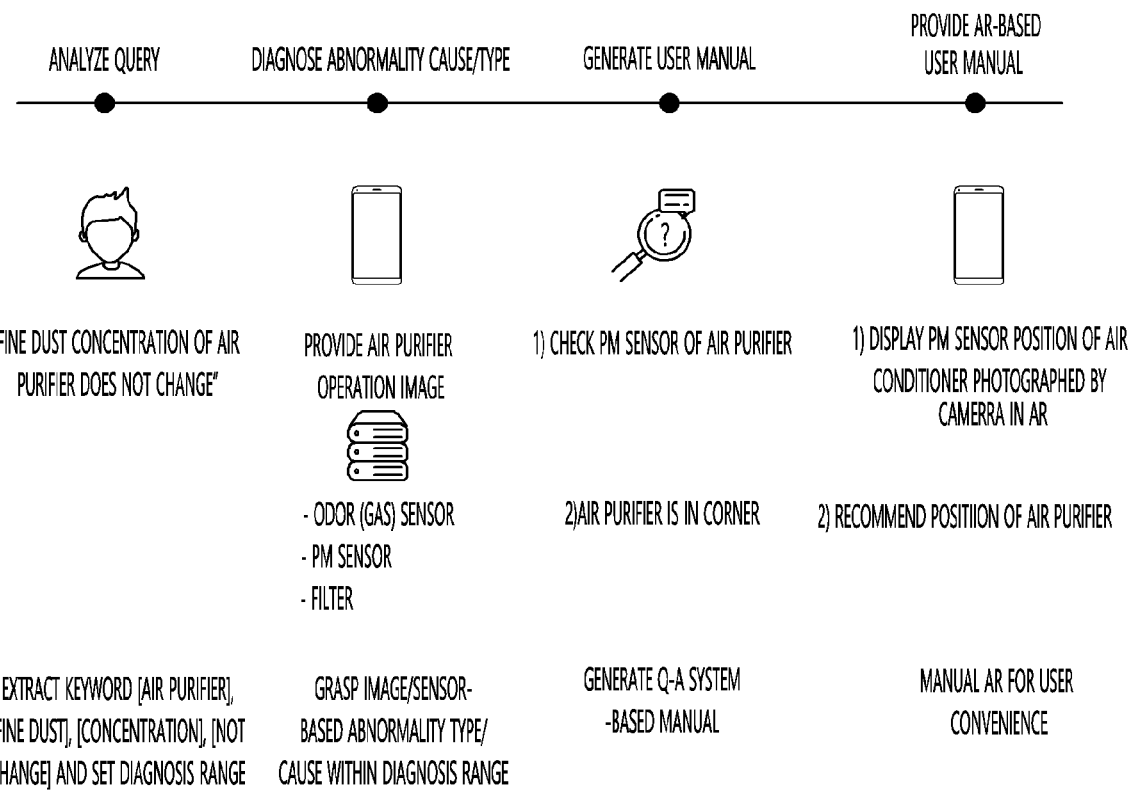

FIG. 7 is a diagram for explaining a process of diagnosing an abnormality of the air purifier and generating a user manual in a case where the target device of the user inquiry is an air purifier.

As shown in FIG. 7, when a user inquiry "The fine dust concentration of the air purifier does not change" from the user is input as voice data, the artificial intelligence apparatus of the present disclosure converts the voice data into text data and extract a keyword corresponding to a device property from the converted text data.

As an example, the artificial intelligence apparatus extracts keywords such as air purifier, fine dust, concentration, no change from the user inquiry, "The concentration of fine dust in the air purifier does not change" and the diagnostic range may be set with the sensor and filter part of the air purifier.

As such, the artificial intelligence apparatus of the present disclosure may analyze the type of the air purifier, the abnormal portion of the air purifier, and the user's request for the air purifier, included in the user inquiry based on the keyword and set the diagnosis range of the air purifier.

In addition, the artificial intelligence apparatus, when receiving at least one of image data and sensor data of the air purifier, may analyzes the Particulate Matter (PM) sensor, odor sensor, and filter portion of the air purifier based on the image data and sensor data and diagnose the type and the cause of the abnormality of the air purifier.

Next, the artificial intelligence apparatus may generate a user manual including the PM sensor confirmation of the air purifier and information on the user response action on the position of the air purifier.

As an example, the artificial intelligence apparatus may provide a user action item portion related to PM sensor check of the air purifier and position of the air purifier in the user manual based on a question-answer system.

Here, the user action item may include a description of how to check the PM sensor of the air purifier and check whether the air purifier is in a corner position.

Next, the artificial intelligence apparatus, when the air purifier photographed through the camera of the user terminal is displayed on the screen of the user terminal, may provide augmented reality (AR)-based PM sensor position and position recommendation of the air purifier to the air purifier displayed on the screen.

As such, the artificial intelligence apparatus of the present disclosure may provide an augmented reality-based user manual for user convenience.

Figure 8:
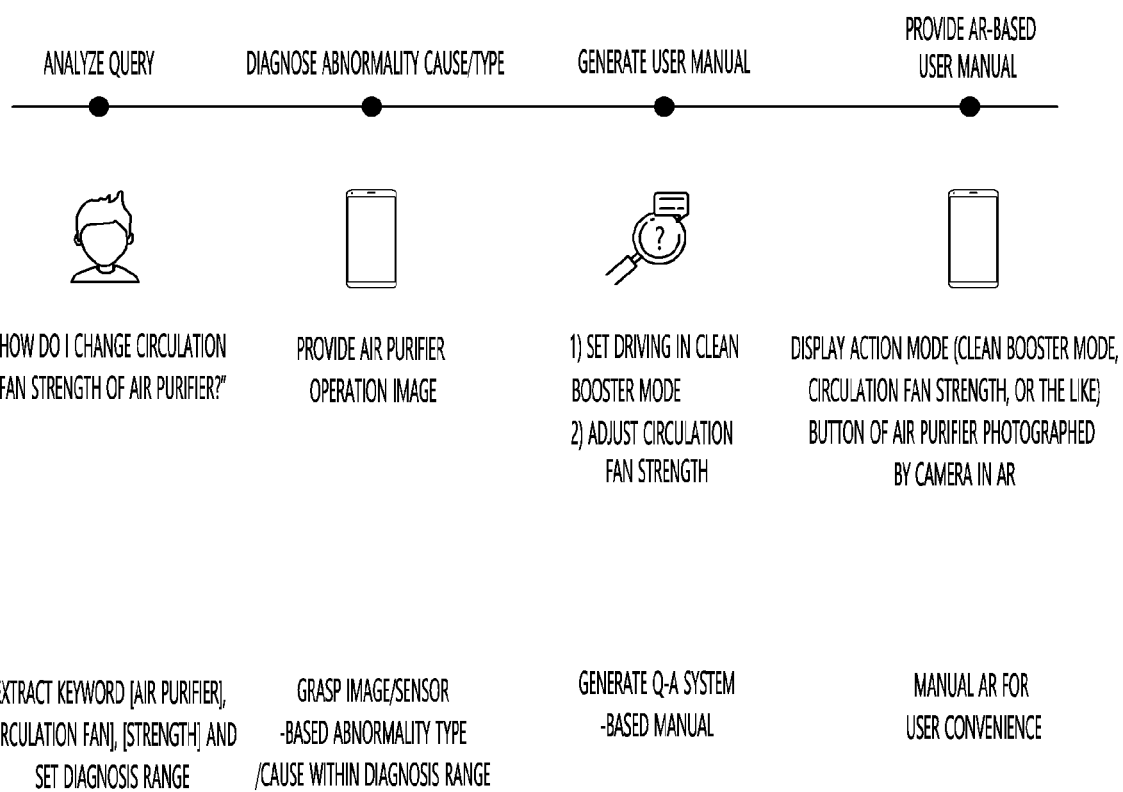

FIG. 8 is a diagram for explaining a process of diagnosing abnormalities and generating a user manual of the air purifier when the target device of the user inquiry is an air purifier.

As shown in FIG. 8, when a user inquiry "How do I change the circulation fan strength of the air purifier?" is input from the user as voice data, the artificial intelligence apparatus of the present disclosure may convert the voice data into text data and extract a keyword corresponding to a device property from the converted text data.

For example, the artificial intelligence apparatus may extract keywords such as air purifier, circulating fan, and strength from a user inquiry, "How do I change the circulation fan strength of the air purifier?"

As such, the artificial intelligence apparatus of the present disclosure may set the diagnosis range of the air purifier by analyzing the type of the air purifier, the abnormal portion of the air purifier, and the user's request for the air purifier included in the user inquiry based on the keyword.

In addition, the artificial intelligence apparatus, when receiving at least one of the image data and the sensor data of the air purifier, may analyze the operation portion of the circulation fan of the air purifier based on the image data and the sensor data to diagnose the type and the cause of the abnormality of the air purifier.

Next, the artificial intelligence apparatus may generate a user manual including the information on the user response action to the driving setting and the circulation fan strength adjustment in the clean booster mode of the air purifier.

As an example, the artificial intelligence apparatus may provide a user action item portion related to driving setting and circulation fan strength adjustment in the clean booster mode of the air purifier in the user manual based on a question-answer system.

Here, the user action item may include a description of a method for setting the driving in the clean booster mode and a method for adjusting the circulation fan strength.

Next, the artificial intelligence apparatus, when the air purifier photographed through the camera of the user terminal is displayed on the screen of the user terminal, may provide the augmented reality (AR)-based clean booster mode button and the circulation fan strength adjustment button to the air purifier displayed on the screen.

As such, the artificial intelligence apparatus of the present disclosure may provide an augmented reality-based user manual for user convenience.

Figure 9:
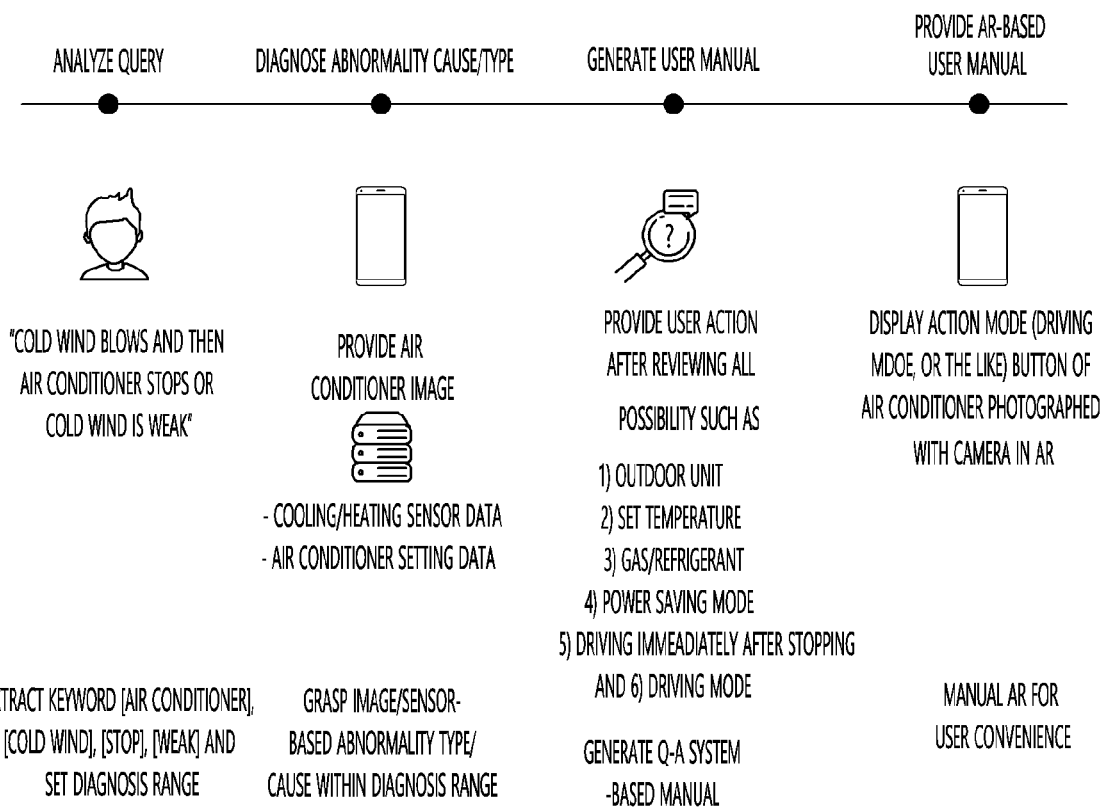

FIG. 9 is a diagram for explaining a process of diagnosing an abnormality of the air conditioner and generating a user manual in a case where the target device of the user inquiry is an air conditioner.

As shown in FIG. 9, when a user inquiry such as "Cold wind blows and then the air conditioner stops or the cold wind is weak" from the user is input as voice data, the artificial intelligence apparatus of the present disclosure may convert the voice data into text data and may extract a keyword corresponding to a device property from the converted text data.

As an example, the artificial intelligence apparatus may extract keywords such as air conditioner, cold wind, stop, weak, or the like from the user inquiry "Cold wind blows and then the air conditioner stops or the cold wind is weak" and set the diagnostic range for the heating and cooling portion of the air conditioner.

As such, the artificial intelligence apparatus of the present disclosure may set the diagnosis range of the air conditioner by analyzing the type of air conditioner, an abnormal portion of the air conditioner, and a user request for the air conditioner, included in the user inquiry based on the keyword.

In addition, the artificial intelligence apparatus, when receiving at least one of image data and sensor data of the air conditioner, may analyze an cooling/heating operation portion of the air conditioner based on the image data and sensor data to diagnose the type and the cause of the abnormality of the air conditioner.

As an example, the sensor data may include cooling/heating sensor data, air conditioning setting data, and the like.

Next, the artificial intelligence apparatus may generate a user manual including information on the user response action for the outdoor unit of the air conditioner, set temperature, gas/refrigerant, power saving mode, driving immediately after stopping, driving mode, and the like.

As an example, the artificial intelligence apparatus may provide a user action item portion related to a heating/cooling operation mode of an air conditioner in a user manual based on a question-answer system.

Here, the user action item may include a description of a method for setting a heating/cooling operation mode and other methods.

Next, the artificial intelligence apparatus, when the air conditioner photographed through the camera of the user terminal is displayed on the screen of the user terminal, may provide an augmented reality (AR)-based heating/cooling driving mode button, or the like to the air conditioner displayed on the screen.

As such, the artificial intelligence apparatus of the present disclosure may provide an augmented reality-based user manual for user convenience.

Figure 10:
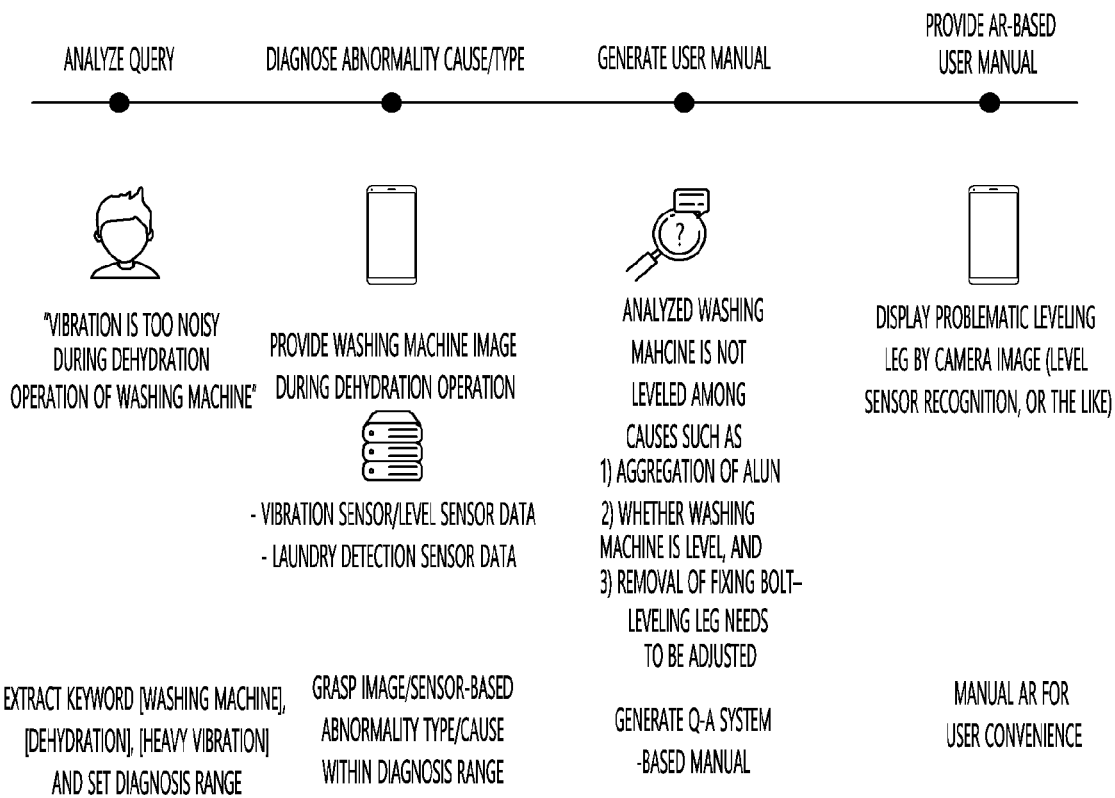

FIG. 10 is a diagram for explaining a process of diagnosing an abnormality of the washing machine and generating a user manual when the target device of the user inquiry is a washing machine.

As shown in FIG. 10, when a user inquiry "The vibration is too noisy during the dehydration operation of the washing machine" is input as voice data from the user, the artificial intelligence apparatus of the present disclosure may convert the voice data into text data and extract a keyword corresponding to a device property from the converted text data.

As an example, the artificial intelligence apparatus may extract keywords such as washing machine, dehydration, and severe vibration from a user inquiry "The vibration is too noisy during the dehydration operation of the washing machine", and set the diagnosis range as the vibration portion of the washing machine.

As described above, the artificial intelligence apparatus of the present disclosure may set the diagnosis range of the washing machine by analyzing the type of washing machine, an abnormal portion of the washing machine, and a user request for the washing machine, included in the user inquiry based on the keyword.

In addition, the artificial intelligence apparatus, upon receiving at least one of image data and sensor data of the washing machine, may analyze the vibration portion of the washing machine based on the image data and sensor data to diagnose the type and the cause of the abnormality of the drum light.

For example, the sensor data may include vibration sensor data, level sensor data, laundry detection sensor data, and the like.

Next, the artificial intelligence apparatus may generate a user manual including information on the user response action for aggregation of laundry, whether the washing machine is level, removal of fixing bolts, and the like.

As an example, the artificial intelligence apparatus may provide a user action item portion related to washing machine vibration in a user manual based on a question-answer system.

Here, the user action item related to the vibration of the washing machine may include a description of a method for adjusting the leveling leg of the washing machine when the washing machine is not level.

Next, the artificial intelligence apparatus, when the washing machine photographed through the camera of the user terminal is displayed on the screen of the user terminal, may provide an augmented reality (AR)-based leveling leg to the washing machine displayed on the screen.

As such, the artificial intelligence apparatus of the present disclosure may provide an augmented reality-based user manual for user convenience.

Figure 11:
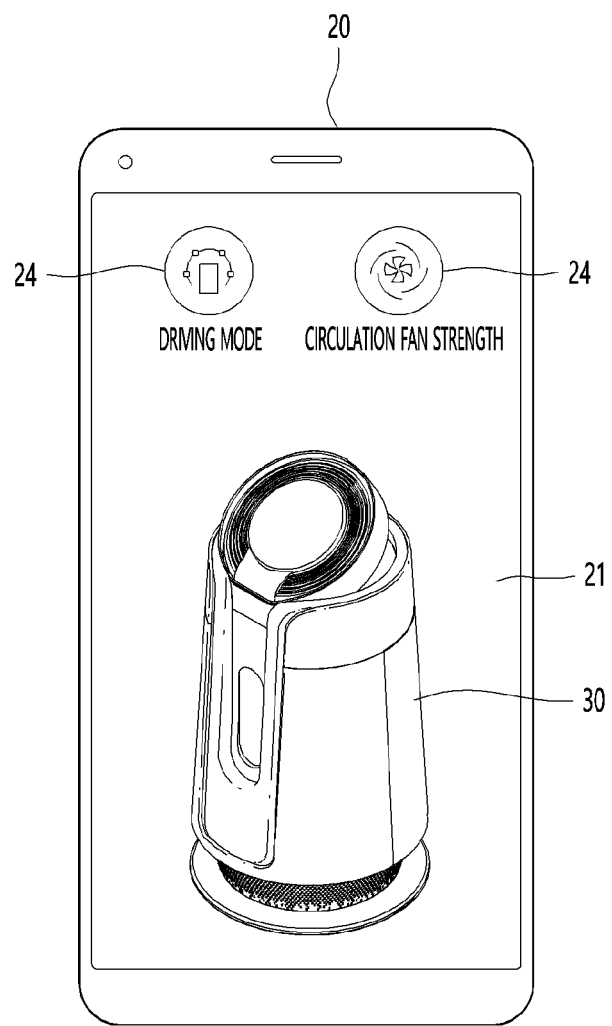
FIGS. 11 to 13 are diagrams for explaining a process of providing an AR-based user manual of an artificial intelligence apparatus according to an embodiment of the present disclosure.
Figure 12:
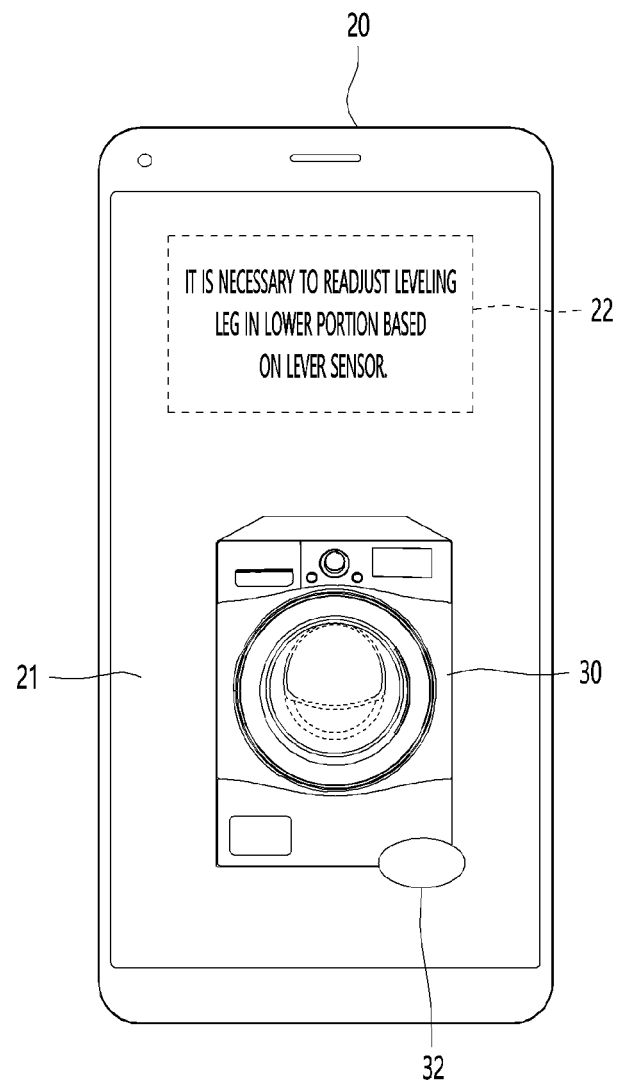
Figure 13:
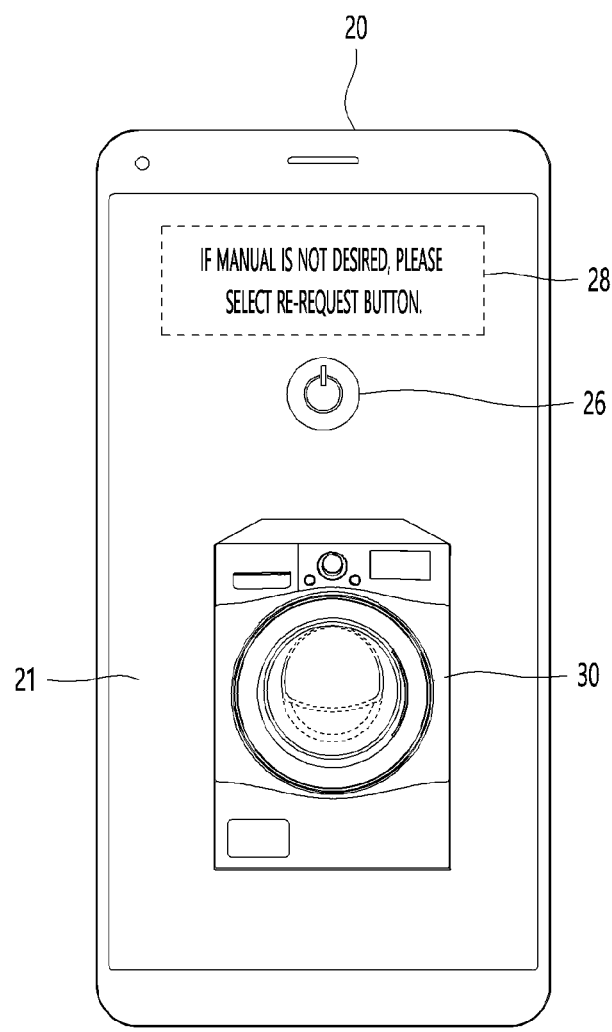

FIGS. 11 to 13 are diagrams for explaining a process of providing an AR-based user manual of an artificial intelligence apparatus according to an embodiment of the present disclosure.

As shown in FIGS. 11 to 13, the artificial intelligence apparatus of the present disclosure, when the target device 30 photographed through the camera of the user terminal 20 is displayed on the screen 21 of the user terminal 20, may provide the augmented reality-based user manual 22 around the target device 30 displayed above the screen 21.

As shown in FIG. 11, the present disclosure, when the user manual includes content related to manipulation of a specific button of the target device 30, may provide the shape of the specific button 24 around the target device 30 displayed on the screen 21 of the user terminal 20 in augmented reality.

In some cases, the present disclosure, when the user manual includes content related to manipulation of a specific button of the target device 30, may provide an identifier informing the target device 30 displayed on the screen of the user terminal 20 of the position of a specific button 24 in augmented reality.

For example, when the user inquiry is "How do I change the circulation fan strength of the air purifier?", the present disclosure may provide an augmented reality-based driving mode button and a circulation fan strength button around the air purifier displayed on the screen 21 when the air purifier photographed through the camera of the user terminal 20 is displayed on the screen 21 of the user terminal 20.

In addition, the present disclosure may provide a user manual "Since the current operation mode is auto mode, set clean booster as the operation mode on the screen first, and then adjust the circulation fan speed."

As shown in FIG. 12, the present disclosure, when the user manual includes content related to manipulation of an abnormality portion of the target device, may provide an identifier informing the target device 30 displayed on the screen of the user terminal 20 of the position of the abnormality portion in augmented reality.

In addition, the present disclosure, when the target device 30 photographed through the camera of the user terminal 20 is displayed on the screen 21 of the user terminal 20, may provide the user manual as voice data, and provide a identifier 32 informing the target device 30 of the specific portion displayed by the voice data of the user manual in augmented reality.

As an example, if the user inquiry is "The vibration is too noisy during the dehydration operation of the washing machine", the present disclosure, when the washing machine photographed through the camera of the user terminal 20 is displayed on the screen 21 of the user terminal 20, may provide the augmented reality-based user manual 22 and the identifier 32 around the washing machine displayed on the screen 21.

Here, the present disclosure may provide the user manual 22, "It is necessary to readjust the leveling leg in the lower portion corresponding to the level sensor", and provides an identifier 32 informing of the position of the leveling leg of the washing machine.

In this case, the identifier 32 may have various shapes and various colors.

As shown in FIG. 13, the present disclosure, when the target device 30 photographed through the camera of the user terminal 20 is displayed on the screen 21 of the user terminal 20, may provide a user manual re-request button 26 around the target device 30 displayed on the screen 21 in the augmented reality.

At this time, the present disclosure, when a user input for selecting the user manual re-request button 26 is received, may reset the diagnosis range of the target device 30, re-perform the diagnosis corresponding to the user inquiry within the reset diagnosis range of the target device 30, and regenerate the user manual for the re-performed diagnosis result to provide the user terminal 20.

At this time, the present disclosure, when a user input for selecting the user manual re-request button 26 is received one or more times, the user inquiry may be re-requested to the user terminal 20.

As an example, the present disclosure, in a case where a user manual "It is necessary to readjust the leveling leg in the lower portion corresponding to the level sensor" is provided in response to a user inquiry related to the washing machine, may provide the user manual re-request button 26 around the washing machine in augmented reality, and provide a notification message saying "If the user manual is not the desired user manual, please select the user manual re-request button on the screen".

Figure 14:
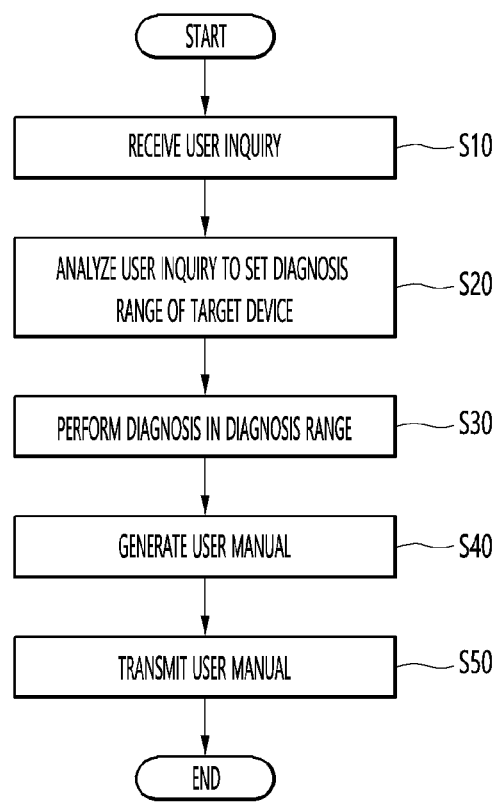
FIGS. 14 and 15 are flowcharts for explaining a method for providing a target device manual of an artificial intelligence apparatus according to an embodiment of the present disclosure.
Figure 15:
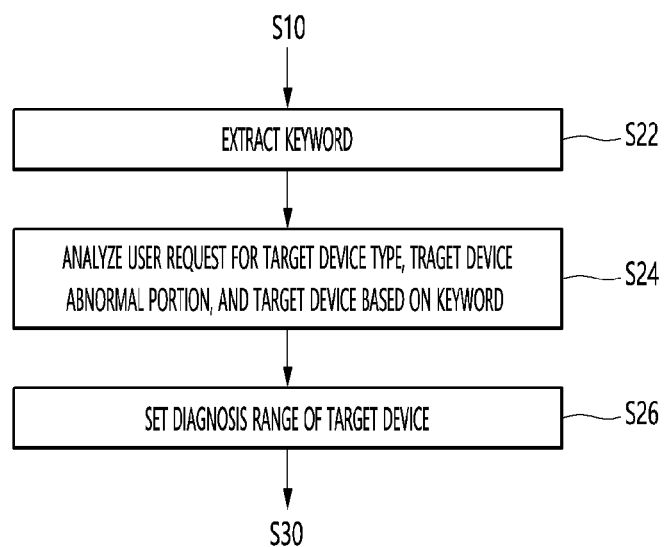

FIGS. 14 and 15 are flowcharts for explaining a method for providing a target device manual of an artificial intelligence apparatus according to an embodiment of the present disclosure.

As shown in FIG. 14, the present disclosure may receive a user inquiry from a user terminal (S10).

Here, the present disclosure may receive a user inquiry in the form of at least one of voice data, image data, and text data.

In addition, the present disclosure may set the diagnosis range of the target device by analyzing the user inquiry (S20).

Here, the present disclosure, when a user inquiry is received, may extract a keyword corresponding to a device property from the user inquiry, and analyze the type of target device, the abnormal portion of the target device, and the user request for the target device, included in the user inquiry based on the extracted keyword to set a diagnostic range of the target device.

As an example, the present disclosure, when a user inquiry including voice data is received, may analyze the voice recognition-based user inquiry to set a diagnosis range of the target device.

In some cases, the present disclosure, when a user inquiry including voice data and image data of a target device are received, may analyze the voice recognition-based user inquiry and the image-based target device to set the diagnosis range of the target device.

As another case, the present disclosure, when a user inquiry including voice data, image data of a target device, and sensor data of a target device are received, may analyze a voice recognition-based user inquiry, an image-based target device, and sensor data based abnormality of the target device to set the diagnostic range of the target device.

Next, the present disclosure may perform a diagnosis corresponding to a user inquiry within a set diagnosis range of the target device (S30).

Here, the present disclosure, if the user inquiry is voice data, may diagnose the type and the cause of the abnormality of the target device within the diagnostic range of the target device set based on the keyword extracted from the voice data.

In some cases, the present disclosure, when at least one of image data and sensor data of the target device is received, may diagnose the type and the cause of the abnormality of the target device within the diagnostic range of the target device set based on at least one of the image data and the sensor data.

Next, the present disclosure, may generate a user manual for the performed diagnosis result (S40).

Here, the present disclosure may generate an augmented reality (AR)-based user manual including information on the user response action based on the cause of the abnormality.

In addition, the present disclosure, the generated user manual may transmit to the user terminal (S50).

Here, the present disclosure may provide an augmented reality-based user manual around the target device displayed on the screen when the target device photographed through the camera of the user terminal is displayed on the screen of the user terminal.

In addition, the present disclosure may transmit the user manual in the form of at least one of audio data, image data, and text data.

FIG. 15 is a view for explaining in detail the step S20 of setting the diagnostic range of the target device of FIG. 14, and, as shown in FIG. 15, the present disclosure, when a user inquiry is received, may extract a keyword corresponding to a device property from the user inquiry (S22).

Here, the present disclosure may input text data corresponding to a user inquiry into a pre-learned artificial intelligence model to extract a keyword, and classify the extracted keyword into as at least one of a device-related keyword, an abnormal-related keyword, and a request-related keyword.

In addition, the present disclosure may analyze the type of target device, an abnormal portion of the target device, and a user request for the target device included in the user inquiry question based on the extracted keyword (S24).

Next, the present disclosure may set a diagnosis range of the target device based on the analysis result (S26).

Here, the present disclosure, if the user inquiry is voice data, may analyze the voice recognition-based user inquiry to primarily set the diagnostic range of the target device, and if the target device-related image data is received, analyze the image-based target device to secondarily set the diagnostic range of the target device.

In some cases, in the present disclosure, if the user inquiry is voice data, may analyze the voice recognition-based user inquiry to primarily set the diagnostic range of the target device, if the target device-related image data is received, analyze the image-based target device to secondarily set the diagnostic range of the target device, and if sensor data of the target device is received, analyze an abnormality of the target device based on the sensor data to tertiarily set the diagnosis range of the target device.

As such, the present disclosure may analyze the user's query to set the diagnostic range of the target device and perform a diagnosis corresponding to the user's query within the set diagnostic range of the target device to provide the user manual based on augmented reality (AR), and thus user convenience can be improved.

In addition, the present disclosure provides an accurate and reliable user manual by performing a complex diagnosis based on image data of the target device and sensor data of the target device within the diagnostic range of the target device corresponding to the user inquiry.

According to the artificial intelligence apparatus according to the present disclosure, a user inquiry is analyzed to set a diagnosis range of a target device, and a diagnosis corresponding to a user inquiry is performed within the diagnosis range of the set target device to provide a user manual based on AR, and thus since there is an effect that user convenience can be improved, industrial applicability is remarkable.

What is claimed is:

1. An artificial intelligence apparatus comprising:
a transceiver configured to communicate with a user terminal; and
a processor configured to control the transceiver,
wherein the processor is further configured to:
based on receiving a user inquiry from the user terminal through the transceiver, analyze the user inquiry to set a diagnostic range of a target device;
receive, from the target device, at least one of image data or sensor data;
perform a diagnosis corresponding to the user inquiry within the set diagnostic range of the target device;
when performing the diagnosis, diagnose a type and a cause of an abnormality of the target device within the set diagnostic range of the target device based on the at least one of the image data or the sensor data received from the target device;
generate a user manual corresponding to a result of the performed diagnosis; and
control the transceiver to transmit the generated user manual to the user terminal,
wherein the processor is further configured to:
when setting the diagnostic range of the target device based on receiving the user inquiry, extract a keyword corresponding to a device property from the user inquiry, and, based on the extracted keyword, analyze a type of the target device, an abnormal portion of the target device, and a user request for the target device included in the user inquiry to set the diagnostic range of the target device;
when setting the diagnostic range of the target device, based on the user inquiry being voice data, analyze the user inquiry based on voice recognition to primarily set the diagnostic range of the target device;
based on receiving target device-related image data from the user terminal, analyze the target device-related image data received from the user terminal to secondarily set the diagnostic range of the target device;

control the transceiver to transmit, to the target device, a request for the at least one of the image data or the sensor data; and based on receiving the sensor data from the target device, analyze an abnormality of the target device based on the sensor data received from the target device to tertiarily set the diagnostic range of the target device.

2. The artificial intelligence apparatus of claim 1, wherein the processor is further configured to:

when extracting the keyword, input text data corresponding to the user inquiry into a pre-learned artificial intelligence model to extract the keyword, and classify the extracted keyword as at least one of a device-related keyword, an abnormality-related keyword, or a request-related keyword.

3. The artificial intelligence apparatus of claim 1, wherein the processor is further configured to:

when performing the diagnosis, based on the user inquiry being voice data, diagnose the type and the cause of the abnormality of the target device within the set diagnostic range of the target device based on a keyword extracted from the voice data.

4. The artificial intelligence apparatus of claim 1, wherein the processor is further configured to:

when generating the user manual, generate an augmented reality (AR)-based user manual including information regarding a user response action based on a cause of an abnormality.

5. The artificial intelligence apparatus of claim 1, wherein the processor is further configured to:

when transmitting the user manual, based on a photograph of the target device, taken by a camera of the user terminal, being displayed on a screen of the user terminal, provide an augmented reality-based user manual for display on the screen adjacent to the photograph of the target device.

6. The artificial intelligence apparatus of claim 5, wherein the processor is further configured to:

based on the user manual including content related to manipulation of a specific button of the target device, provide a shape of the specific button for display on the screen adjacent to the photograph of the target device in augmented reality.

7. The artificial intelligence apparatus of claim 5, wherein the processor is further configured to:

based on the user manual including content related to manipulation of a specific button of the target device, provide an identifier indicating a position of the specific button of the target device for display on the screen of the user terminal in augmented reality.

8. The artificial intelligence apparatus of claim 5, wherein the processor is further configured to:

based on the user manual including contents related to manipulation of an abnormal portion of the target device, provide an identifier indicating a position of the abnormal portion of the target device for display on the screen of the user terminal in augmented reality.

9. The artificial intelligence apparatus of claim 1, wherein the processor is further configured to:

when transmitting the user manual, based on a photograph of the target device, taken via a camera of the user terminal, being displayed on a screen of the user terminal, provide a user manual re-request button for display on the screen adjacent to the photograph of the target device in augmented reality.

10. The artificial intelligence apparatus of claim 9, wherein the processor is further configured to:

based on receiving a user input for selecting the user manual re-request button, reset the diagnostic range of the target device, re-perform the diagnosis corresponding to the user inquiry within the reset diagnostic range of the target device, and re-generate the user manual corresponding to a result of the re-performed diagnosis to provide the user manual to the user terminal.

11. A method performed at an artificial intelligence device that is communicatively coupled to a user terminal, the method comprising:

receiving a user inquiry from the user terminal;

setting a diagnostic range of a target device by analyzing the user inquiry;

receiving, from the target device, at least one of image data or sensor data;

performing a diagnosis corresponding to the user inquiry within the set diagnostic range of the target device;

when performing the diagnosis, diagnosing a type and a cause of an abnormality of the target device within the set diagnostic range of the target device based on the at least one of the image data or the sensor data received from the target device;

generating a user manual corresponding to a result of the performed diagnosis; and transmitting the generated user manual to the user terminal, wherein setting the diagnostic range of the target device based on receiving the user inquiry comprises:

extracting a keyword corresponding to a device property from the user inquiry, and, based on the extracted keyword, analyzing a type of the target device, an abnormal portion of the target device, and a user request for the target device included in the user inquiry to set the diagnostic range of the target device;

based on the user inquiry being voice data, analyzing the user inquiry based on voice recognition to primarily set the diagnostic range of the target device;

based on receiving target device-related image data from the user terminal, analyzing the target device-related image data received from the user terminal to secondarily set the diagnostic range of the target device;

transmitting, to the target device, a request for the at least one of the image data or the sensor data; and based on receiving the sensor data from the target device, analyzing an abnormality of the target device based on the sensor data received from the target device to tertiarily set the diagnostic range of the target device.

* * * * *